(12) United States Patent
Seccia

(10) Patent No.: US 6,388,717 B1
(45) Date of Patent: May 14, 2002

(54) DIGITAL TELEVISION TRANSMITTING SYSTEM HAVING DATA AND CLOCK RECOVERING CIRCUIT

(75) Inventor: Joseph Lee Seccia, Quincy, IL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/233,974

(22) Filed: Jan. 20, 1999

(51) Int. Cl.[7] .............................. H04N 5/38; H04N 7/24
(52) U.S. Cl. .................... 348/723; 348/423.1; 348/724; 348/471; 375/333; 375/361; 375/282
(58) Field of Search ................................. 348/723, 724, 348/725, 729, 423.1, 21, 471, 472, 608; 375/333, 361, 282, 295, 326, 327; 341/70, 71, 68, 69

(56) References Cited

U.S. PATENT DOCUMENTS

| | | | |
|---|---|---|---|
| 3,932,705 A | | 1/1976 | Wulleman |
| 4,344,041 A | * | 8/1982 | Maine .......................... 329/307 |
| 4,361,895 A | * | 11/1982 | Khoudari ..................... 375/333 |
| 4,426,714 A | * | 1/1984 | Ashida ........................ 375/361 |
| 4,550,337 A | | 10/1985 | Dischert et al. |
| 4,763,338 A | | 8/1988 | Barndt, Sr. |
| 4,771,440 A | * | 9/1988 | Fromm ........................ 375/279 |
| 5,418,818 A | | 5/1995 | Marchetto et al. |
| 5,446,765 A | * | 8/1995 | Leger ........................... 375/359 |
| 5,465,268 A | * | 11/1995 | Rainbolt ...................... 375/333 |
| 5,726,650 A | * | 3/1998 | Yeoh et al. .................... 341/70 |
| 5,892,797 A | * | 4/1999 | Deng ............................. 341/7 |
| 6,185,255 B1 | * | 2/2001 | Twitchell et al. ......... 375/240.25 |
| 6,212,201 B1 | * | 4/2001 | Hinderks et al. ............ 370/468 |
| 6,269,127 B1 | * | 7/2001 | Richards ..................... 375/282 |
| 6,275,537 B1 | * | 8/2001 | Lee ........................ 375/240.28 |

FOREIGN PATENT DOCUMENTS

| | | |
|---|---|---|
| DE | 3144263 A1 | 5/1983 |
| WO | WO8701006 | 2/1987 |

OTHER PUBLICATIONS

A copy of European Search Report dated Aug. 3, 2000.
ATSC Digital Television Standard, Advanced Television Systems Committee, by James C. McKinney, Chairman and Dr. Robert Hopkins, Executive Director, Sep. 16, 1995.
Phase–Locked Loops, *Principles and Practices,* by Paul V. Brennan, Department of Electronic and Electrical Engineering University College London, 1996, pp. 160–163.

* cited by examiner

Primary Examiner—Wendy R. Garber
Assistant Examiner—Jean W. Désir
(74) *Attorney, Agent, or Firm*—Tarolli, Sundheim, Covell, Tummino & Szabo L.L.P.

(57) ABSTRACT

A digital television transmitting system is presented having a recovery circuit for recovering non-return to zero (NRZ) data pulses and transport clock pulses from a biphase-mark serial data pulse stream and wherein the recovered NRZ data pulses and the recovered transport clock pulses are applied to modulation and amplifying circuits for broadcasting by an antenna. The recovery circuit includes a first circuit for receiving the biphase-mark serial pulse stream and providing therefrom a train of first clock pulses wherein the rising edge of each the biphase-mark pulse corresponds with a rising edge of one of the first clock pulses. A second circuit receives the biphase-mark serial data pulses and the first clock pulses for providing therefrom a train of de-serialized data pulses each having a rising edge corresponding with a rising edge of one of the first clock pulses. A third circuit receives the de-serialized data pulses and the first clock pulses and converts the de-serialized data pulses into recovered NRZ data pulses.

32 Claims, 4 Drawing Sheets

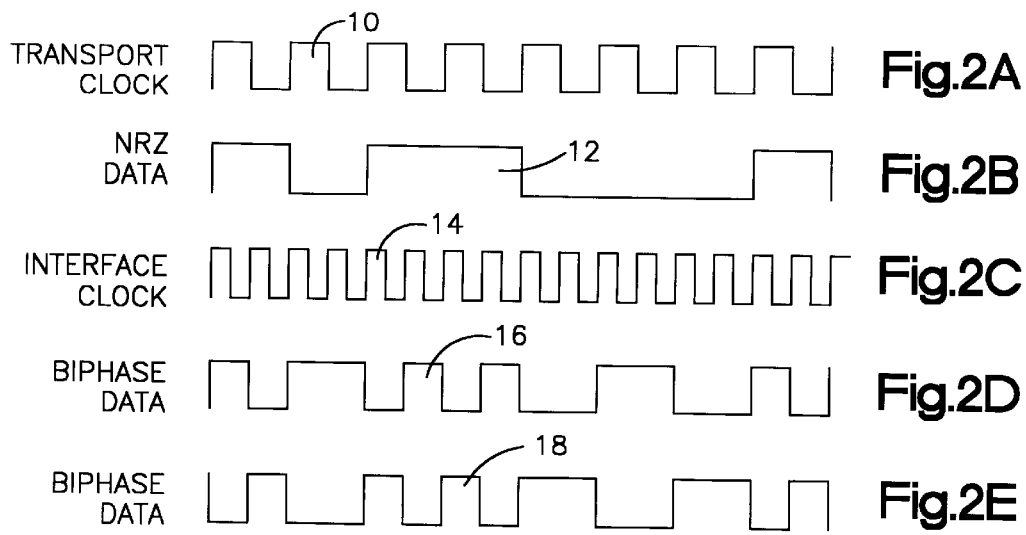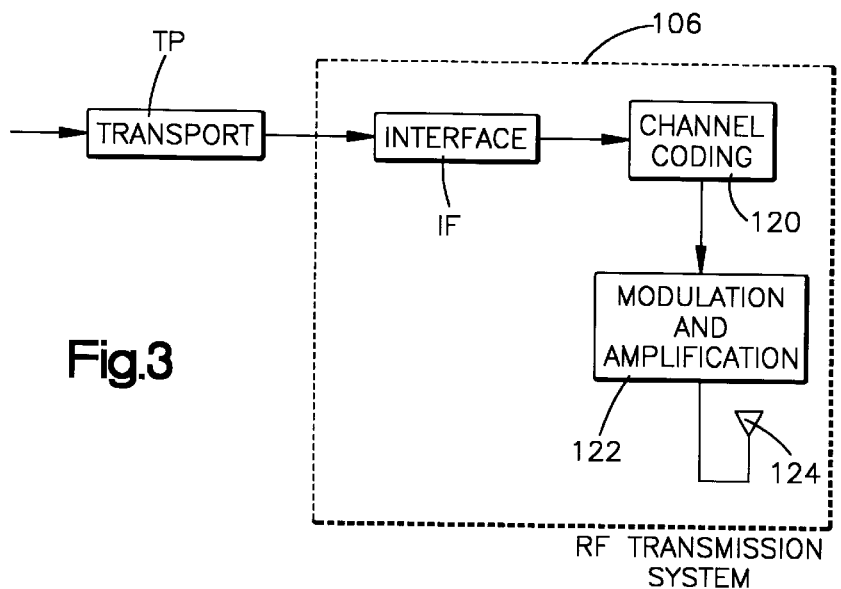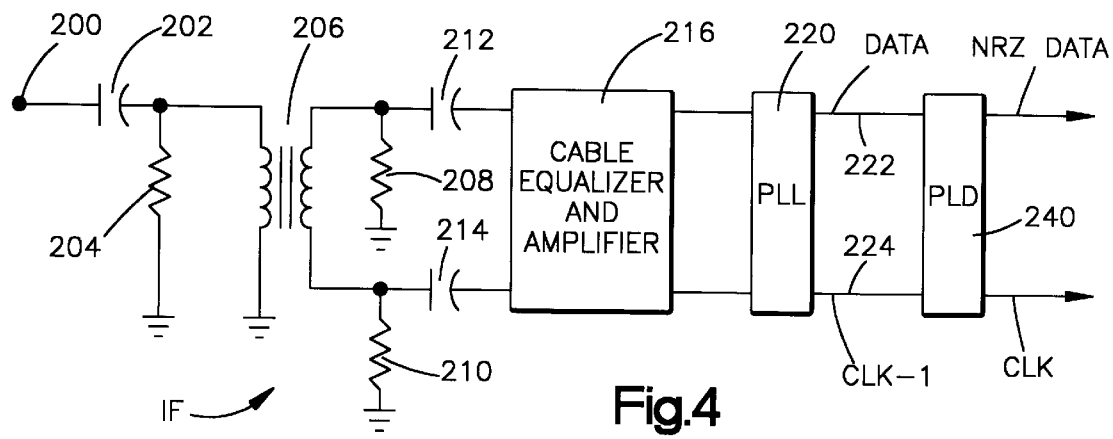

DIGITAL TELEVISION TRANSMITTING SYSTEM HAVING DATA AND CLOCK RECOVERING CIRCUIT

BACKGROUND AND FIELD OF THE INVENTION

The present invention relates to RF broadcasting and specifically to a digital television transmitting system having a circuit for recovering data pulses and transport clock pulses from a serial data pulse stream.

DESCRIPTION OF THE PRIOR ART

In the United States, the Federal Communications Commission (FCC) has established guidelines for broadcasting television signals. Digital television signals (DTV) as well as analog NTSC signals will be simultaneously broadcast for a period until approximately the year 2006, after which only DTV signals will be broadcast.

In a proposed DTV system, and as shown in FIG. 1, a signal bearing video and audio data may be sent from a signal source, such as a television studio to a RF/Transmission site which may not be co-located therewith. In such a system, the video and audio data signal may be transmitted (or transported) from the studio to the RF/Transmission site using conventional communications techniques, such as microwave links. This signal, often referred to as the Transport Signal, will contain both the data and the clock for the data. The frequency of the transport clock has been established as being 19.39 MHz for the DTV known as the 8 VSB format. The data to be transported at this frequency is a pulse stream of non-return to zero (NRZ) data. It is proposed that the NRZ data and the transport clock be combined to form a single serial pulse stream employing biphase-mark coding as will be discussed hereinafter. This entails providing an interface clock double that of the transport clock to provide the biphase-mark serial data pulse stream.

The present invention is directed toward a recovery circuit for recovering the NRZ data pulses and the transport clock pulses from the biphase-mark serial data pulse stream.

SUMMARY OF THE INVENTION

In accordance with the present invention a digital television transmitting system is provided having a recovery circuit for recovering non-return to zero (NRZ) data pulses and transport clock pulses from a biphase-mark serial data pulse stream. The recovered NRZ data pulses and transport clock pulses were previously combined into the biphase-mark serial data pulse stream. The recovered NRZ data pulses and the transport clock pulses are intended to be applied to modulation and amplifying circuitry for broadcasting by an antenna.

The recovery circuit includes a first circuit that receives the biphase-mark serial data pulse stream and provides therefrom a train of first clock pulses such that the rising edge of each biphase-mark serial data pulse corresponds with the rising edge of one of the first clock pulses. A second circuit receives the biphase-mark serial data pulses and the first clock pulses and provides therefrom a train of de-serialized data pulses each having a rising edge corresponding with a rising edge of one of the first clock pulses. A third circuit receives the de-serialized data pulses and the first clock pulses and converts the de-serialized data pulses into recovered NRZ data pulses.

In accordance with a more limited aspect of the present invention an inverter receives the first clock pulses and provides therefrom a train of second clock pulses of the same frequency and which are inverted from that of the first clock pulses.

In accordance with a still further aspect of the present invention a clock divider receives the first clock pulses and provides therefrom a train of third clock pulses and which third clock pulses are at a frequency one-half that of the first clock pulses.

In accordance with a still further aspect of the present invention a second inverter receives the third clock pulses and provides therefrom a train of fourth clock pulses of the same frequency as the third clock pulses but inverted therefrom and with the fourth clock pulses serving as the recovered transport clock pulses.

In accordance with a still further aspect of the present invention a data retimer receives the recovered NRZ data pulses and shifts the recovered NRZ data pulses so that the rising edge of each recovered transport clock pulse is located between the rising edge and falling edge of each the NRZ data pulse.

BRIEF DESCRIPTION OF THE DRAWINGS

The foregoing and other objects and advantages will become more readily apparent from the following description as taken in conjunction with the accompanying drawings wherein:

FIG. 2 which is comprised of FIGS. 2A, 2B, 2C, 2D and 2E are timing diagrams of amplitude versus time which are helpful in understanding the invention herein;

FIG. 3 is a functional block diagram illustration of one embodiment of the present invention;

FIG. 4 is a schematic-block diagram illustration of one embodiment of the present invention;

DESCRIPTION OF PREFERRED EMBODIMENT

Figure 1:
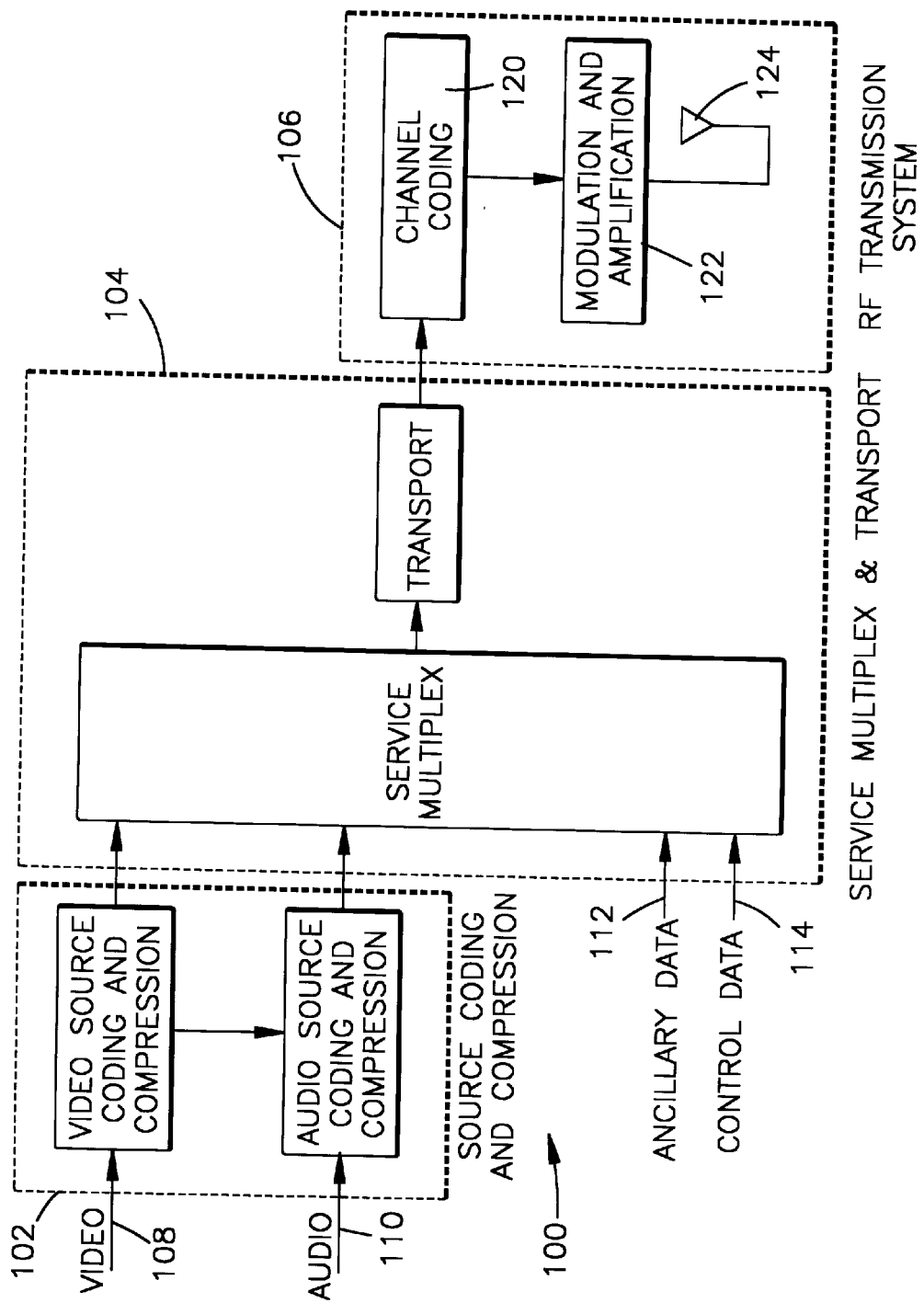
FIG. 1 is a functional block diagram illustration of a prior art digital television system.

Before describing the preferred embodiment herein, reference is first made to FIG. 1 which illustrates a prior art system. As defined by the Advanced Television Systems Committee (ATSC) Digital Television Standard, dated Sep. 16, 1995, which is incorporated herein by reference, a basic DTV system 100 block diagram consists of three sections, as shown in FIG. 1, including a source coding and compression section 102, a service multiplex and transport section 104, and a RF/Transmission System 106. The source coding and compression section 102 receives a video signal 108 and an audio signal 110 and encodes these signals, respectively, into digital data streams. The encoding may include bit rate reduction methods and compression techniques known and appropriate for video and audio data.

With continued reference to FIG. 1, the encoded video and audio data may be provided to the service multiplex and transport section 104 along with ancillary data signals 112 and control data signals 114. The ancillary signals 112 and control signals 114 may include control data, conditional access control data and data associated with the audio and video services, such as closed captioning. Generally, the video signals may be compressed using a MPEG-2 video stream syntax and the audio signals may be compressed using the Digital Audio Compression (AC-3) Standard.

In the service multiplex and transport section 104, the compressed data stream may be divided into packets of information and means for identifying each packet or packet type may be appended. In the process, the video data stream, audio stream and ancillary data stream packets may be multiplexed into a single data stream, as is well known in the art. The packeted data may be transported by the MPEG-2 transport system for the packetizing and multiplexing of video, audio and data signals for digital broadcast systems.

In the RF/Transmission section 106 the packeted data is channel coded and modulated. A channel coder 120 may modify the data stream and add additional information that can be used by the receiver to reconstruct the data from a received signal which has been affected by typical transmission interference sources.

The modulation 122 uses the digital data stream to modulate the transmitted signal. In a DTV standard, the modulation can use an 8 VSB modulation scheme. The modulated signal may be amplified and applied to an antenna 124 for broadcast in a conventional fashion.

Reference is now made to FIG. 2A which illustrates the transport clock data stream 10. This clock for the 8 VSB modulation format is at a frequency of 19.39 MHz. This establishes the bit rate for data to be transferred or transported from the transport unit TP in the service multiplex and transport unit 104. The data is preferably non-return to zero data (NRZ data) as indicated by the NRZ data 12. It is preferred that the transport clock 10 and the NRZ data be transmitted from the transport unit TP to the RF transmission system by way of a single serial data stream. The preferred encoding for the single data stream has been established as being biphase-mark coding. This is accomplished by combining the NRZ data with an interface clock 14 operating at twice the bit rate of the transport clock 10. The data is combined with a simple coding scheme known as biphase-mark in which a transition is caused to occur at the boundary of each bit cell. An additional transition is also introduced in the middle of any bit cell which is set to a binary state "1". Another means of stating the encoding rules is as follows: A transition always occurs at the beginning of a bit whatever its value (0 or 1) For a logic 1, a transition occurs in the middle of the bit. For a logic 0, there is no transition in the middle of the bit. This coding scheme eliminates almost all DC content from the signal, making it possible to use transformer coupling if necessary, and also allows for phase inversion of the data signal, since it is only the transition which matters, not the direction of the transition. The biphase data takes the form as shown by pulse stream 16 or 18, shown in FIGS. 2D and 2E. The polarity, whether positive pulses 16 or negative pulses 18 are involved, is dependent upon initial conditions.

NRZ data pulses each represent a bi-level signal that does not change its signal value during the duration of a bit. Thus, the NRZ data pulses in FIG. 2B represent logic levels 10110001. This is a non return to zero (NRZ) pulse stream.

The biphase data pulses in FIG. 2D are at double the pulse rate of the NRZ data pulses and each data level is represented by two successive data pulses. A "1" level is represented by two pulses of different value, such as 1-0 or 0-1. Thus, the biphase data stream is not an NRZ data stream. A "0" level is represented by two pulses of the same value, such as 1-1 or 0-0.

The NRZ data 12 to be recovered from the biphase data pulse stream 16 (or 18) is intended to be supplied to an RF transmission system including an exciter circuit (shown herein as including the channel coding unit 120). The exciter or channel coding circuitry serves as an utilization device and the NRZ data is clocked into the utilization device at the recovered transport bit rate and preferably at a point in time when the recovered transport clock rate has a rising edge.

In accordance with the present invention, an interface IF is interposed between the transport and the channel coding 120. The interface, as will be described in greater detail hereinafter, includes recovery circuitry for recovering the NRZ data and the transport clock from the received biphase-mark serial data pulse stream.

Reference is now made to FIG. 4 which illustrates the interface circuit IF of FIG. 3 in greater detail. As shown in FIG. 4 the interface circuit IF has an input 200 for receiving the biphase-mark serial data pulse stream. A capacitor 202 serves to pass AC signals and block DC components and, hence, this capacitor blocks any large DC voltage that might damage the circuitry. The biphase-mark serial data pulse stream is passed by the capacitor. A resistor 204 provides termination for a cable connected to the input terminal 200 from either the transport unit or from a receiving microwave device. The incoming data stream is applied to an AC coupling network 206 taking the form of a transformer having a secondary winding coupled to resistors 208 and 210, which resistors serve to properly terminate the cable, together with a pair of capacitors 212 and 214 which provide AC coupling to a cable equalizer and amplifier circuit 216. The circuit 216 includes an amplifier that adjusts the amplitude of the incoming signal to compensate for cable losses. Also, the circuit 216 provides equalization to compensate for cable losses causing rounded off edges of the pulses. The equalizing circuitry serves to square up the pulse edges.

The output from the cable equalizer and amplifier circuit 216 is supplied to a phase locked loop circuit (PLL) 220 which passes the biphase-mark serial data pulse stream on output line 222 and recovers clock pulses. These clock pulses are on output line 224 and correspond with the interface clock pulses 14 (FIG. 2C). They are referred to hereinafter as clock 1 (CLK-1) and appear in the timing chart of FIG. 6 herein. The phase locked loop circuit 220 is preferably an integrated circuit capable of recovering a clock pulse stream at the frequency employed (38.78 MHz for the interface clock pulse rate). Other clock recovery circuits capable of operating at this frequency level may be employed and such circuits are typically known as phase and frequency detectors. From an economical standpoint it is preferred to employ an integrated circuit for this purpose.

Figure 5:
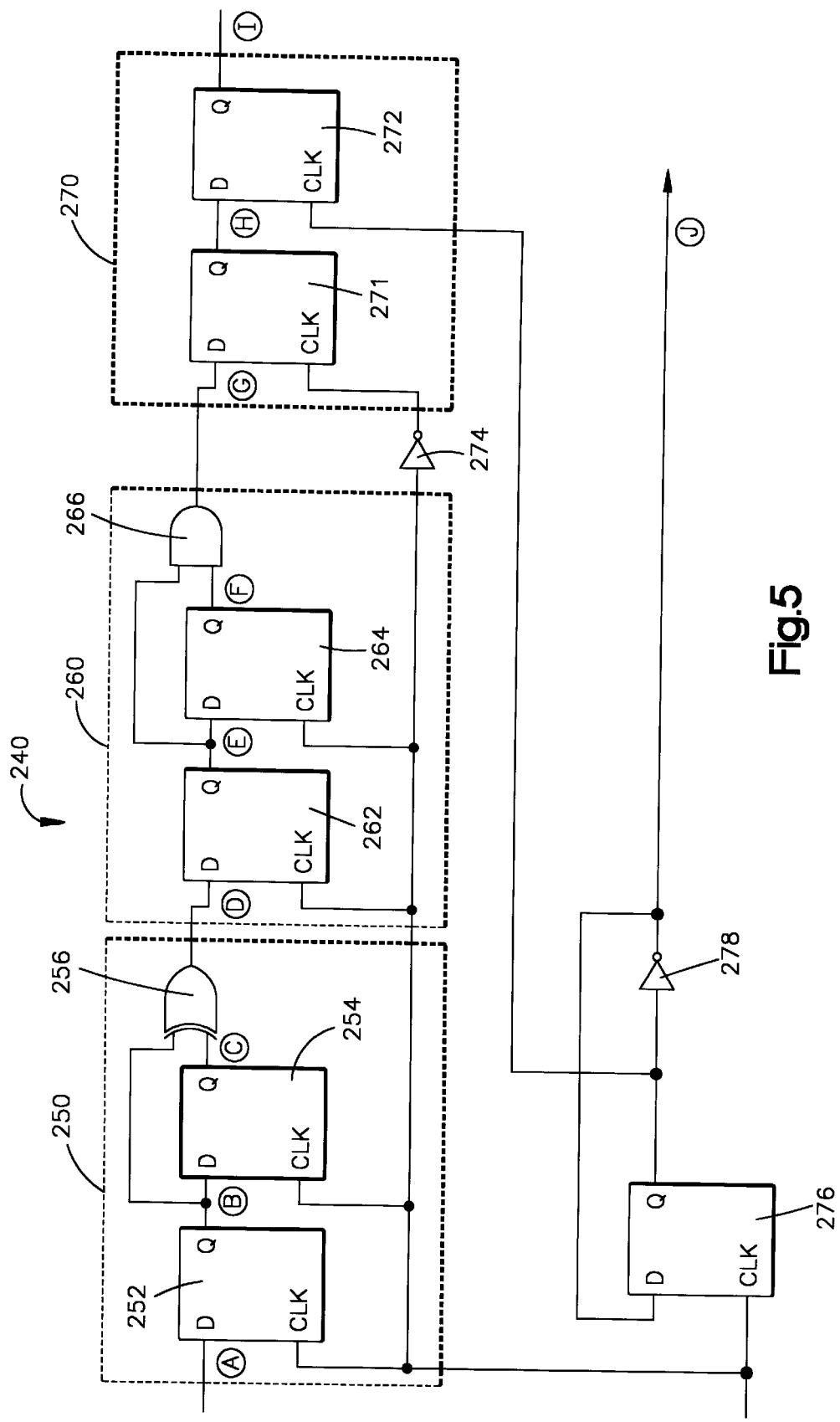
FIG. 5 is a schematic diagram illustration of a programmable logic device (PLD) circuit in accordance with the present invention; and, FIG. 6 is a timing diagram of amplitude versus time illustrating the operation of the circuitry shown in FIG. 5.

The biphase-mark data pulses on line 222 and the clock CLK-1 pulses on line 224 are supplied to a programmable logic device 240 which serves to recover a NRZ data (data pulses 12 in FIG. 2B) as well as the original clock (see transport clock pulses 10 in FIG. 2A). This circuit 240 is illustrated in greater detail in FIG. 5 and its operation is illustrated by the timing chart of FIG. 6. As shown in FIG. 5, circuit 240 includes a circuit 250 that receives the biphase-mark serial data pulses at circuit point A and the clock pulses CLK-1 from circuit 220 and provides therefrom a train of deserialized data pulses at circuit point D with each pulse having a rising edge corresponding with a rising edge of one of the clock pulses CLK-1. Circuit 250 includes single bit registers 252 and 254 which are connected together in series. These registers take the form of D type flip-flops. The Q output of each register 252 and 254 is connected to an input of an exclusive OR gate 256. The operation that takes place may be noted with reference to the timing chart of FIG. 6.

Figure 6:
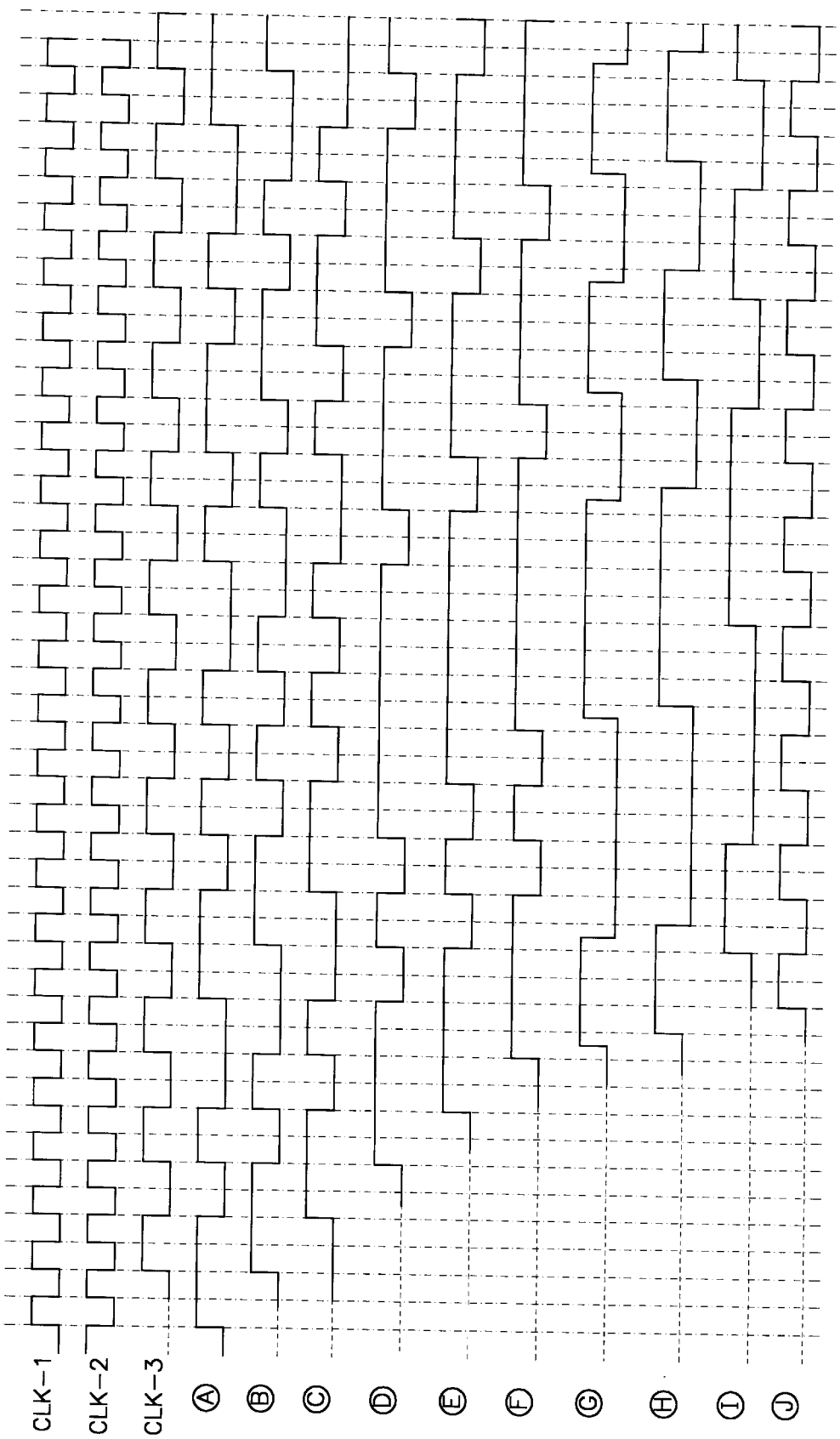

FIG. 6 is a timing chart showing the various clock pulses and data pulses. The data pulses are located at circuit points A, B, C, D, E, F, G, H, I, (in FIG. 5) and the output clock is located at circuit point J.

As shown in FIG. 6 the input biphase-mark serial data pulses at circuit point A are shifted by one bit position by the register 252 as indicated at circuit point B. This data pulse stream is shifted again by register 254 as indicated at circuit point C. The Q outputs of registers 252 and 254 are applied to the exclusive OR gate 256 with the result being the deserialized data stream as indicated by the waveform at circuit point D. The deserialized data at circuit point D as well as clock pulses CLK-1 are supplied to circuit 260 which includes a pair of one bit registers 262 and 264 connected together in series with the Q outputs of each register being connected to an AND gate 266. The data stream at circuit points E and F are shown in the timing chart of FIG. 6 from which it will be noted that the output at circuit point G has a slight delay resulting from the operation of the AND gate 266. The output at circuit point G is the result of converting the deserialized data pulses at circuit point D into NRZ data pulses.

The NRZ data pulses at circuit point G are supplied to a circuit 270 which serves as a data retimer circuit and which shifts the data pulses in the manner as will be described below.

Circuit 270 includes a pair of series connected single bit registers 271 and 272. The clock pulses CLK-1 are inverted by an inverter 274 to supply clock pulses CLK-2 to the clock input of flip-flop 271. Additionally, the clock pulses CLK-1 are supplied to the clock input of another register 276 which serves as a divider for dividing the clock rate by a factor of 2 to provide clock pulses CLK-3. These clock pulses are supplied to the clock input of register 272. In addition, the Q output of register 276 is supplied to an inverter 278 which provides the recovered output clock pulses at circuit point J.

The re-timing circuit 270 serves to shift the NRZ data at circuit point G sufficient that the rising edge of each recovered transport clock pulse (the output clock at circuit point J) is located between the rising edge and the falling edge of each NRZ data pulse (at circuit point I). This is the desired relationship between the clock pulses and the NRZ data as it insures that the data is correctly clocked into the utilization device at the receiving unit such as the channel coding circuit 120 in FIG. 3. Note that is the leading edge of the output clock coincides with the leading edge of the NRZ data pulses, errors may result from inaccurate clocking of data into the utilization device.

Although the invention has been described in conjunction with preferred embodiments, it is to be appreciated that various modifications may be made without departing from the spirit and scope of the invention as defined by the appended claims.

Having described the invention, I claim:

1. A digital television transmitting system having a recovery circuit for recovering non-return to zero (NRZ) data pulses and transport clock pulses from a biphase-mark serial data pulse stream wherein said NRZ data pulses and said transport clock pulses were previously combined into said biphase-mark serial data pulse stream and wherein said recovered NRZ data pulses and said recovered transport clock pulses are to be applied to modulation and amplifying means for broadcasting by an antenna, said recovery circuit comprising:

first means for receiving said biphase-mark serial pulse stream and providing therefrom a train of first clock pulses wherein the rising edge of each said biphase-mark pulse corresponds with a rising edge of one of said first clock pulses;

second means for receiving said biphase-mark serial data pulses and said first clock pulses for providing therefrom a train of de-serialized data pulses each having a rising edge corresponding with a rising edge of one of said first clock pulses; and, third means for receiving said de-serialized data pulses and said first clock pulses for converting said de-serialized data pulses into recovered NRZ data pulses.

2. A system as set forth in claim 1 including inverter means for receiving said first clock pulses and providing therefrom a train of second clock pulses of the same frequency and which are inverted from that of said first clock pulses.

3. A system as set forth in claim 2 including clock divider means for receiving said first clock pulses and providing therefrom a train of third clock pulses and which third clock pulses are at a frequency one-half that of said first clock pulses.

4. A system as set forth in claim 3 including second inverter means for receiving said third clock pulses and providing therefrom a train of fourth clock pulses of the same frequency as said third clock pulses but inverted therefrom and with said fourth clock pulses serving as the recovered said transport clock pulses.

5. A system as set forth in claim 4 including data re-timing means for receiving said recovered NRZ data pulses and shifting said recovered NRZ data pulses so that the rising edge of each-recovered transport clock pulse is located between the rising edge and falling edge of each said NRZ data pulse.

6. A system as set forth in claim 1 wherein said first means is a phase locked loop.

7. A system as set forth in claim 6 wherein said phase locked loop is an integrated circuit.

8. A system as set forth in claim 6 wherein said second means includes first and second single bit registers connected together in series and an exclusive OR gate connected to the outputs of said first and second registers.

9. A system as set forth in claim 8 wherein each of said first and second registers is a D type flip flop.

10. A system as set forth in claim 6 wherein said third means includes third and fourth single bit registers connected together in series and an AND gate connected to the outputs of said third and fourth registers.

11. A system as set forth in claim 10 wherein each of said third and fourth registers is a D type flip flop.

12. A system as set forth in claim 8 wherein said third means includes third and fourth single bit registers connected together in series and an AND gate connected to the outputs of said third and fourth registers.

13. A system as set forth in claim 12 including inverter means for receiving said first clock pulses and providing therefrom a train of second clock pulses of the same frequency and which are inverted from that of said first clock pulses.

14. A system as set forth in claim 13 including clock divider means for receiving said first clock pulses and providing therefrom a train of third clock pulses and which third clock pulses are at a frequency one-half that of said first clock pulses.

15. A system as set forth in claim 14 including second inverter means for receiving said third clock pulses and providing therefrom a train of fourth clock pulses of the same frequency as said third clock pulses but inverted therefrom and with said fourth clock pulses serving as the recovered said transport clock pulses.

16. A system as set forth in claim 15 including data re-timing means for receiving said recovered NRZ data pulses and shifting said recovered NRZ data pulses so that the rising edge of each recovered transport clock pulse is located between the rising edge and falling edge of each said NRZ data pulse.

17. A digital television transmitting system having a recovery circuit for recovering non-return to zero (NRZ) data pulses and transport clock pulses from a biphase-mark serial data pulse stream wherein said NRZ data pulses and said transport clock pulses were previously combined into said biphase-mark serial data pulse stream and wherein said recovered NRZ data pulses and said recovered transport clock pulses are to be applied to circuitry for broadcasting by an antenna, said recovery circuit comprising:

a first circuit that receives said biphase-mark serial data pulse stream and provides therefrom a train of first clock pulses wherein the rising edge of each said biphase-mark pulse corresponds with a rising edge of one of said first clock pulses;

a second circuit that receives said biphase-mark serial data pulse stream and said first clock pulses for providing therefrom a train of de-serialized data pulses each having a rising edge corresponding with a rising edge of one of said first clock pulses; and, a third circuit that receives said de-serialized data pulses and said first clock pulses and converts said de-serialized data pulses into recovered NRZ data pulses.

18. A system as set forth in claim 17 including an inverter that receives said first clock pulses and provides therefrom a train of second clock pulses of the same frequency and which are inverted from that of said first clock pulses.

19. A system as set forth in claim 18 including a clock divider that receives said first clock pulses and provides therefrom a train of third clock pulses and which third clock pulses are at a frequency one-half that of said first clock pulses.

20. A system as set forth in claim 19 including a second inverter that receives said third clock pulses and provides therefrom a train of fourth clock pulses of the same frequency as said third clock pulses but inverted therefrom and with said fourth clock pulses serving as the recovered said transport clock pulses.

21. A system as set forth in claim 20 including a data re-timer that receives said recovered NRZ data pulses and shifts said recovered NRZ data pulses so that the rising edge of each recovered transport clock pulse is located between the rising edge and falling edge of each said NRZ data pulse.

22. A system as set forth in claim 17 wherein said first circuit is a phase locked loop.

23. A system as set forth in claim 22 wherein said phase locked loop is an integrated circuit.

24. A system as set forth in claim 22 wherein said second circuit includes first and second single bit registers connected together in series and an exclusive OR gate connected to the outputs of said first and second registers.

25. A system as set forth in claim 24 wherein each of said first and second registers is a D type flip flop.

26. A system as set forth in claim 22 wherein said third circuit includes third and fourth single bit registers connected together in series and an AND gate connected to the outputs of said third and fourth registers.

27. A system as set forth in claim 26 wherein each of said third and fourth registers is a D type flip flop.

28. A system as set forth in claim 24 wherein said third circuit includes third and fourth single bit registers connected together in series and an AND gate connected to the outputs of said third and fourth registers.

29. A system as set forth in claim 28 including an inverter that receives said first clock pulses and providing therefrom a train of second clock pulses of the same frequency and which are inverted from that of said first clock pulses.

30. A system as set forth in claim 29 including a clock divider that receives said first clock pulses and provides therefrom a train of third clock pulses and which third clock pulses are at a frequency one-half that of said first clock pulses.

31. A system as set forth in claim 30 including a second inverter that receives said third clock pulses and provides therefrom a train of fourth clock pulses of the same frequency as said third clock pulses but inverted therefrom and with said fourth clock pulses serving as the recovered said transport clock pulses.

32. A system as set forth in claim 31 including data re-timer that receives said recovered NRZ data pulses and shifts said recovered NRZ data pulses so that the rising edge of each recovered transport clock pulse is located between the rising edge and falling edge of each said NRZ data pulse.

* * * * *